United States Patent [19]
Ueno et al.

[11] Patent Number: 5,560,894
[45] Date of Patent: Oct. 1, 1996

[54] PROCESS FOR TREATMENT OF EXHAUST GAS

[75] Inventors: Tsutomu Ueno; Yutaka Kitayama; Hiroaki Tsuchiai, all of Sapporo; Atsushi Tatani; Hiroshi Fujita, both of Hiroshima; Shinichiro Kotake, Tokyo, all of Japan

[73] Assignees: Hokkaido Electric Power Co., Inc., Sapporo; Mitsubishi Jukogyo Kabushiki Kaisha, Tokyo, both of Japan; a part interest

[21] Appl. No.: 351,746

[22] Filed: Dec. 8, 1994

Related U.S. Application Data

[63] Continuation of Ser. No. 122,092, Sep. 16, 1993, abandoned.

[30] Foreign Application Priority Data

Sep. 16, 1992 [JP] Japan .................................. 4-246393
Oct. 11, 1992 [JP] Japan .................................. 4-299642
Feb. 8, 1993 [JP] Japan .................................. 5-191088

[51] Int. Cl.$^6$ .................... B01J 8/00; C01B 7/00; C01B 17/22
[52] U.S. Cl. .................... 423/239.1; 423/240 R; 423/243.01; 423/243.08; 423/244.07
[58] Field of Search .................... 423/243.08, 243.01, 423/239.1, 240 R, 240 S, 244.07

[56] References Cited

U.S. PATENT DOCUMENTS

| 4,279,873 | 7/1981 | Felsvang et al. | 423/242 |
| 4,442,080 | 4/1984 | Donnelly et al. | 423/239 |
| 4,804,521 | 2/1989 | Rochelle et al. | 423/242 |

FOREIGN PATENT DOCUMENTS

| 0409761 | 1/1991 | European Pat. Off. |
| 4101439 | 8/1991 | Germany. |
| 58-76127 | 5/1983 | Japan. |
| 6438130 | 2/1989 | Japan. |
| 2162162 | 1/1986 | United Kingdom. |
| WO89/07974 | 9/1989 | WIPO. |

OTHER PUBLICATIONS

Translated abstract of above document (attached to document).

*Hackh's Chemical Dictionary*, 1987 (no month) p. 338 Grant et al.

Primary Examiner—Gary P. Straub
Assistant Examiner—Thomas G. Dunn, Jr.
Attorney, Agent, or Firm—Jacobson, Price, Holman & Stern, PLLC

[57] ABSTRACT

A process for removing environmental contaminants from an exhaust gas by a semidry method through contact with an absorbent slurry containing alkaline compounds in a reactor, comprising the steps of adding a material containing calcium sulfate and/or calcium sulfite, a material containing aluminum oxide, and a material containing silicon dioxide to a material capable of supplying calcium oxide, mixing the mixture with water, curing the whole mixture in hot water, and then introducing and dispersing the resulting absorbent slurry in the reactor for contact with the environmental contaminants. In a modification the absorbent slurry is obtained by adding a material capable of supplying aluminum oxide, silicon dioxide, and calcium sulfate and/or calcium sulfite to a material capable of supplying calcium oxide, calcining the mixture at 750°–950° C., mixing the calcined product with water, and curing the mixture in hot water. To the absorbent slurry obtained in either way is added a soluble compound that elevates the boiling point of water.

13 Claims, 3 Drawing Sheets

F I G.1
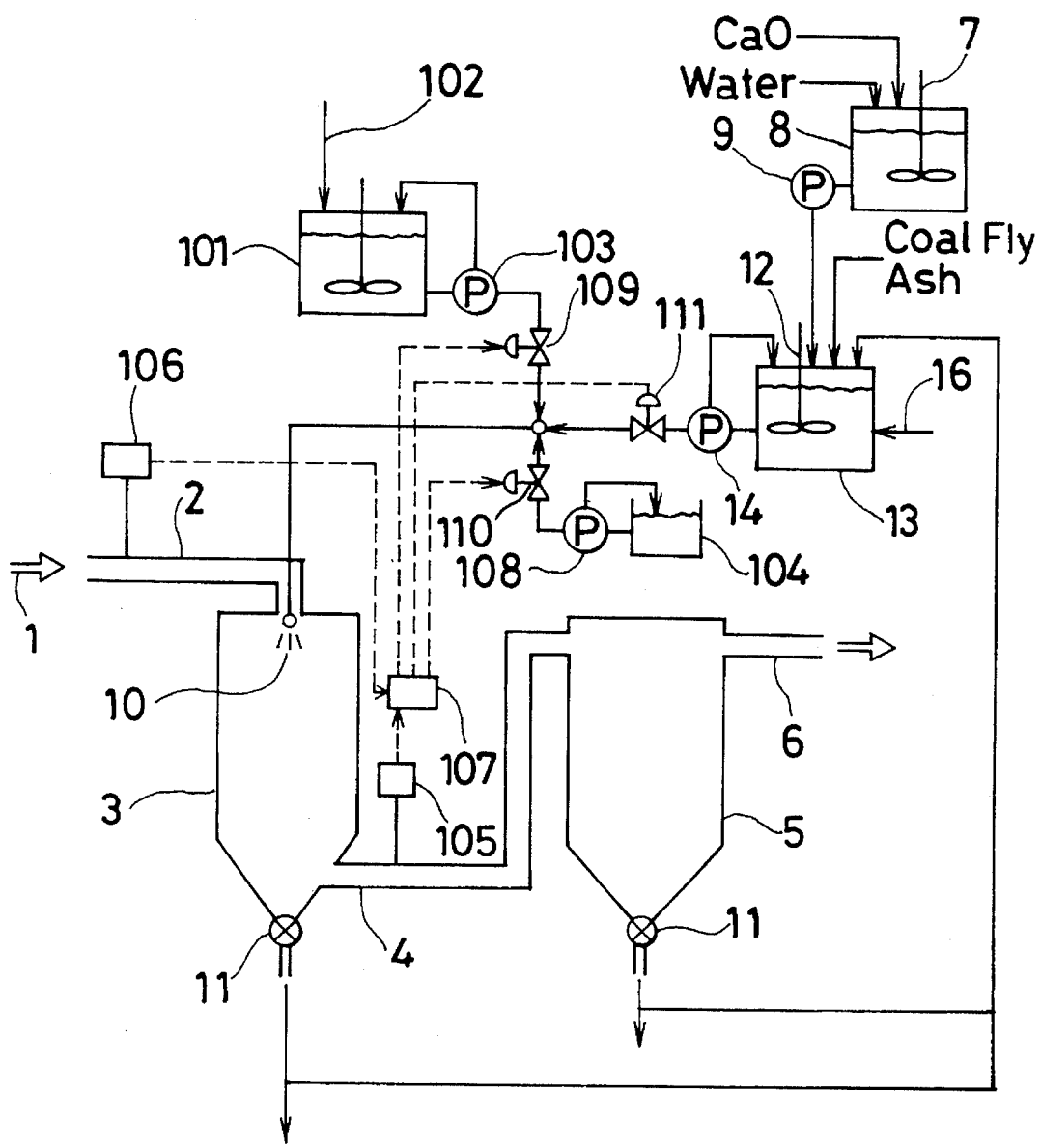

5,560,894

PROCESS FOR TREATMENT OF EXHAUST GAS

This is a continuation of application Ser. No. 08/122,092, filed Sep. 16, 1993 now abandoned.

FIELD OF THE INVENTION AND RELATED ART STATEMENT

This invention relates to a process for the treatment of exhaust gas by a semidry method in which acidic gases and environmental contaminants contained in exhaust gas, such as $SO_x$, $NO_x$, HF, and HCl, can be efficiently removed without the discharge of liquid effluent.

Semidry exhaust gas treatment is widely known in the and removal of HCl from refuse incinerator emission. Various processes have thus far been proposed for the treatment of such exhaust gas. Of those, techniques of removing $SO_x$ from coal-fired boiler exhaust gas have been particularly sought after because of the importance of controlling acid rain.

The conventional techniques, as typically illustrated costs. The disadvantages, however, include: (1) that the $SO_x$ in FIG. 2, feature simple constructions and low equipment removal is about 70–80% at most; and (2) that the reaction rate of the absorbent is low and the cost of replenishing the expensive absorbent is high.

A conventional technique will now be described with reference to FIG. 2.

An $SO_x$-containing combustion gas 1 is introduced through an exhaust inlet line 2 into a reactor 3. From the reactor 3 the gas is led through an outlet line 4 to a reaction product collector (bag filter or electric static precipitator) 5, and then the purified gas is released to the atmosphere by way of a gas outlet line 6. Meanwhile hydrated lime powder used as an $SO_x$ absorbent is slurried with water in an alkali tank 8 equipped with an agitator 7. A slurry pump 9 forces the resulting slurry into the reactor 3 through an atomizer 10, so that the slurry is sprayed and brought into contact with the exhaust gas. The exhaust gas at the inlet of the reactor 3 is at a high temperature of 100° C. or more. It is cooled by contact with the absorbent slurry and discharged at about 60° C. During this process water evaporates from the absorbent slurry, and the spent absorbent in the form of powder is taken out from a spent absorbent outlet 11.

The absorbent slurry sprayed in the reactor 3 takes the form of wet $Ca(OH)_2$ particles. $SO_x$ gas is taken up by the moisture of the particles and readily reacts with the $Ca(OH)_2$ to form $CaSO_3$ particles. Because of subsequent evaporation of the moisture forces the $SO_x$ gas to react with dry $Ca(OH)_2$ particles. This reaction proceeds much more slowly than the preceding $SO_x$-absorbing reaction of the wet $Ca(OH)_2$ that takes place in the presence of moisture. Consequently, the $SO_x$ removal is low and the reaction ratio of $Ca(OH)_2$ is about 50% at most. It appears impossible to achieve a higher efficiency in either respect. For effective utilization of the calcium left unreacted in the reaction products, the recycling of the spent absorbent that is otherwise discharged from the system into the absorbent slurry has been done in practice. However, this causes the reaction product $CaSO_3$ to surround the individual $Ca(OH)_2$ particles. Even if the spent absorbent is slurried, the elution of the unreacted $Ca(OH)_2$ is so slow that the spent absorbent cannot be effectively and sufficiently utilized.

OBJECT AND SUMMARY OF THE INVENTION

An objection of the present invention is to provide a process for treating exhaust gas which overcomes the above-described two problems: (1) low $SO_x$ removal; and (2) low utilization of the absorbent.

The present invention thus provides:

(1) A process for removing environmental contaminants from an exhaust gas by a semidry method in which the exhaust gas is brought into contact with an absorbent slurry containing alkaline compounds in a reactor, comprising the steps of adding a material containing at least one of calcium sulfate and calcium sulfite, a material containing aluminum oxide, and a material containing silicon dioxide to a material capable of supplying calcium oxide, mixing the mixture with water, curing the whole mixture in hot water, and then introducing and dispersing the resulting absorbent slurry into the reactor for contact with the environmental contaminants.

(2) The process as claimed in (1) above, wherein the temperature for curing in hot water ranges from 90° to 180° C.

(3) The process as claimed in (1) or (2) above, wherein, prior to the curing of the absorbent slurry in hot water at 90°–180° C., the material containing at least one of calcium sulfate and calcium sulfite, the material containing aluminum oxide, and the material containing silicon dioxide are added to the material capable of supplying calcium oxide during and/or immediately after the conclusion of hydration of the material capable of supplying calcium oxide.

(4) The process as claimed in (1) above, wherein, prior to the curing of the absorbent slurry in hot water at 90°–180° C., the material containing aluminum oxide, the material containing calcium sulfite, and the material containing silicon dioxide are added altogether to water for slaking calcium oxide.

(5) The process as claimed in any of (1) to (4) above, wherein the composition of the material capable of supplying calcium oxide, the material containing aluminum oxide, the material containing silicon dioxide, and the material containing at least one of calcium sulfate and calcium sulfite comprises 15–72 wt % CaO, 0.5–20 wt % $Al_2O_3$, 1.5–40 wt % $SiO_2$, and 0.5–25 wt % $CaSO_4$ or/and $CaSO_3$.

(6) A process for removing environmental contaminants from an exhaust gas by a semidry method through contact with an absorbent slurry which contains alkaline compounds in a reactor, comprising the steps of adding a material capable of supplying aluminum oxide, silicon dioxide, and at least one of calcium sulfate and calcium sulfite to a material capable of supplying calcium oxide, calcining the mixture at 750°–950° C., mixing the calcining product with water, curing the mixture in hot water to obtain an absorbent slurry, and then introducing and dispersing the absorbent slurry into the reactor for contact with the environmental contaminants.

(7) The process as claimed in (6) above, wherein the material capable of supplying calcium oxide is limestone and the material capable of supplying aluminum oxide, silicon dioxide, and at least one of calcium sulfate and calcium sulfite is coal.

(8) The process as claimed in any one of claims 1 through 7, wherein the spent absorbent that results from the dispersed introduction of the absorbent slurry into the reactor and the contact of the slurry with the environmental contaminants in the exhaust gas, is cured alone or together with the materials containing calcium oxide, at least one of calcium sulfate and calcium sulfite, aluminum oxide, and silicon dioxide in hot water at 90°–180° C., and the resulting slurry is again introduced and dispersed into the reactor for contact with environmental contaminants.

(9) The process as claimed in any of claims 1 through 8, wherein a soluble compound that elevates the boiling point of water is added to and mixed with the absorbent slurry.

(10) The process as claimed in claim 9, wherein the soluble compound that elevates the boiling point of water is seawater and/or the reaction product.

For the purposes of describing the invention, the term "semidry method" is used to mean a process in which an aqueous solution is sprayed but is completely evaporated in the reactor. The term "$SO_x$" is a generic term denoting the sulfur oxides present in, e.g., the atmosphere or exhaust gases. The term "$NO_x$" is a generic term of the nitrogen oxides present in, e.g., the atmosphere or exhaust gases.

Materials capable of supplying calcium oxide and used in the present invention are, e.g., quicklime, hydrated lime, calcium carbonate (limestone), cement, slag, or (lime-containing) dolomite plaster. Examples of materials containing calcium sulfate are gypsum dihydrate, gypsum hemihydrate, and anhydrous gypsums. Materials containing calcium sulfite are calcium sulfate hemihydrate.

Among aluminum oxide-containing materials that can be used in the present invention are the compounds that contain reactive aluminum, such as alumina, aluminum hydroxide, aluminum silicate, alum cake, alum, aluminum sulfide, aluminum sulfate, aluminum chloride, bentonite, kaolin, diatom earth, zeolite, and perlite.

Examples of the materials containing silicon dioxide are silica, metasilicic acid, aluminum silicate, and calcium silicate. Other examples are compounds containing reactive silicon dioxide, such as cristobalite, tridymite, kaolin, bentonire, talc, perlite, "shirasu" (white, sandy volcanic deposit), diatom earth, and water glass.

Typical of other materials containing two or more out of the five different compounds are coal fly ash (source of calcium oxide, silicon dioxide, and aluminum oxide), cement (source of calcium oxide, calcium sulfate, silicon dioxide, and aluminum oxide), slag, and minerals that contain reactive silicon dioxide, aluminum, calcium, etc., such as "shirasu", andesire, chert, liparite, opal, zeolite, feldspar, clay minerals, and ettringite. Typical of still other materials containing both calcium sulfate and calcium sulfite are spent absorbents.

Of the compounds mentioned above, the materials essential for the constitution of the absorbent according to the present invention are a material capable of supplying calcium oxide, a material containing aluminum oxide, a material containing silicon dioxide, and a material containing at least calcium sulfate and calcium sulfite. These materials are mixed in various combinations within the ranges of 15–72 wt % as CaO, 0.5–20 wt % as $Al_2O_3$, 1.5–40 wt % as $SiO_2$, and 0.5–25 wt % as $CaSO_4$ or/and as $CaSO_3$. Such a mixture is generally mixed with water, the amount of which is 2.5–10 times as much by weight as the mixture, and the whole mixture is cured in hot water (usually at 90°–100° C. for 6–12 hours) to yield an absorbent slurry. The absorbent slurry so obtained contains a gelled material. The gelled material has a specific surface area of up to 50–100 m²/g and has been modified to a very porous material compared with the specific surface area of the $Ca(OH)_2$ particles in use as a conventional absorbent. This gelled material exhibits high activity that has never been attained in absorbing acidic gases, such as $SO_x$, $NO_x$, HF, HCl.

This gelled material, whose structure is to be exactly clarified yet, is considered to be analogous to ettringite ($3CaO·Al_2O_3·3CaSO_4·32H_2O$) from X-ray analysis and electron micrography. An amorphous calcium silicate compound that comes from $SiO_2$ is also present in the material.

The absorbent slurry for use in the present invention is obtained by adding an aluminum oxide-containing material, a silicon dioxide-containing material, and a material containing calcium sulfate and/or calcium sulfite to a material capable of supplying calcium oxide, mixing the mixture with water, and curing the whole mixture in hot water. A typical procedure for preparing the slurry will now be explained.

When quicklime is used as a material capable of supplying calcium oxide, it is desirable to add quicklime first to water for hydrated to give an active slaked lime slurry, and then add to the slurry an aluminum oxide-containing material, silicon dioxide-containing material, and a material containing calcium sulfate and/or calcium sulfite. The reason for this ordering of addition of the materials is that especially when a material containing calcium sulfate is to be added, if $SO_4$ ions coming from calcium sulfate are present in the water to which the quicklime is added for slaking it is difficult to obtain active hydrated lime.

When a material containing calcium sulfite is added, its very low solubility reduces the influence of $SO_3$ ion upon the slaking of quicklime to a negligible level. When a calcium sulfite-containing material is used, therefore, it is not in the least objectionable to add it simultaneously with aluminum oxide and silicon dioxide to slaking water for calcium oxide. Curing the mixture in hot water affords a highly active absorbent slurry.

If hydrated lime is used in place of quicklime, it may be added together with the other materials to be added too. Generally, however, quicklime is often preferred as a starting material because it is available at lower costs. An additional advantage of quicklime is that the heat it generates during slaking can be exploited.

For the preparation of the absorbent to be used in accordance with the present invention, curing in hot water or hydration is indispensable. The expression "curing in hot water" as used herein encompasses, besides the reaction with heat applied from the outside, the hydration that makes use of the lime's own heat generation as noted above.

One of the requirements for forming a highly active gelled material is a proper curing temperature, which desirably ranges from 90° to 180° C. The temperature depends on the time required for curing. Curing takes hours when the temperature is low, but concludes in a matter of minutes at high temperatures. Specifically a high temperature is chosen for of $SO_x$ is utilized as a material containing calcium sulfate curing because, when a spent absorbent after the absorption and/or calcium sulfite, the higher the temperature the more effectively it is dissolved out into the slurry. Thus curing in hot water accelerates the formation of an active gelled material.

Generally, the time required for curing varies with the compositional ratio of materials to be added to the material capable of supplying calcium oxide, i.e., the compositional ratio of the material containing aluminum oxide and silicon oxide and the material containing calcium sulfate and/or calcium sulfite.

With the absorbent slurry according to the invention it is desirable that the composition of the materials that supply or contain the afore-said compounds constituting the absorbent be chosen from the ranges of 15–72 wt % as CaO, 1.5–40 wt % as $SiO_2$, 0.5–20 wt % as $Al_2O_3$, and 0.5–25 wt % as $CaSO_4$ or/and as $CaSO_3$, and that the order of addition, and the curing temperature and time be varied as needed.

The use of less than 15 wt % CaO is not advisable, although it gives an active gelled material, because the available calcium content per unit weight of the absorbent becomes insufficient, calling for an increase in the quantity of the absorbent.

When the proportion of the material capable of supplying calcium oxide is high, in the range of 65–72 wt % as CaO [85–95 wt % as Ca(OH)$_2$], a recommended procedure is the addition of the silicon dioxide-containing material, aluminum oxide-containing material, and the material containing calcium sulfate and/or calcium sulfite either while the hydration of the material capable of supplying calcium oxide is in progress and/or immediately after the conclusion of the reaction. In this case a temperature that permits operation at ordinary pressure, say between 90° to 100° C., is desirable for the convenience of slaking and curing.

A higher temperature and a higher pressure are used when a spent absorbent is utilized as a material containing calcium sulfate and/or calcium sulfite. These conditions promote the elution of the above substances with the consequence that accelerated reactions with other materials permit conclusion of the curing within a shorter period of time.

Another benefit of shortening the curing time wherever possible is that it helps avoid the solidification of the absorbent slurry. The gelled material formed by curing in hot water is by nature prone to solidification. Especially when the proportion of the material containing or capable of supplying calcium oxide is small, in the range of 15–38 wt % as CaO [20–50 wt % as Ca(OH)$_2$], curing at a low temperature for a long time can increase the viscosity of the slurry up to a solid state. If curing is to be performed in a short time period, preferably within one hour, it is necessary to allow hydration to proceed at a high temperature of about 180° C. and at a high pressure.

When a material containing a predominantly calcium sulfite compound is to be used with a material capable of supplying calcium oxide in a proportion of 15–72 wt % as CaO, it is possible to add the predominantly calcium sulfite compound together with the materials containing silicon dioxide and aluminum oxide to slaking water for the material containing calcium oxide. By this procedure too, a highly active absorbent slurry is obtained.

In this case, it is advisable that calcium sulfate that adversely affects the slaking of calcium oxide be not contained at first. However, calcium sulfite need not be used alone; e.g., a spent absorbent that has absorbed SO$_x$ and is obtained as a mixture of calcium sulfite and calcium sulfate may be employed. In the latter case, the proportion of calcium sulfate to calcium sulfite is desirably below 20 wt %. If it is above this level calcium sulfate can begin influencing the slaking of calcium oxide unfavorably. At the stage of curing that follows slaking, part of calcium sulfite is oxidized to calcium sulfate. The calcium sulfate thus formed has no adverse effect on the absorbent activity.

A desirable composition of a material containing or capable of supplying calcium oxide, a material containing aluminum oxide, a material containing silicon dioxide, and a material containing calcium sulfate and/or calcium sulfite to give an absorbent slurry according to the present invention is within the ranges of 15–72 wt % as CaO, 0.5–20 wt % as Al$_2$O$_3$, 1.5–40 wt % as SiO$_2$, and 0.5–25 wt % as CaSO$_4$ or/and as CaSO$_3$. The quantity of water to be added to such a mixture in order to prepare a slurry desirably ranges from 2.5 times to 10 times the total weight of the materials containing or capable of supplying the above compounds.

The absorbent of the present invention may also be prepared in modified ways as follows.

The process thus far described for the preparation of the absorbent typically comprises the basic steps of slaking calcium oxide with water to form hydrated lime slurry, adding a material containing aluminum oxide, a material containing silicon dioxide, and a material containing calcium sulfate and/or calcium sulfite to the slurry and mixing them altogether, and then curing the mixture in hot water. An alternative process consists of adding a material capable of supplying aluminum oxide, silicon dioxide, and calcium sulfate and/or calcium sulfite to a material capable of supplying calcium oxide, calcining the mixture, mixing the calcined product with water, and then curing the mixture in hot water.

For the latter process calcium carbonate (limestone) is suitably used as a material capable of supplying calcium oxide. Calcium oxide is produced industrially by firing limestone. As a material capable of supplying aluminum oxide, silicon dioxide, and calcium sulfate and/or calcium sulfite, coal may be used. Coal can be utilized as a heat source for firing limestone and, moreover, it serves as a source for supplying a material derived from combustion ash and which contains silicon dioxide and aluminum oxide. It can further act as a source for supplying a material originating from the sulfur oxides in combustion gas and which contains calcium sulfate and/or calcium sulfite.

The decomposition temperature for calcium carbonate is generally 900° C., and in industrial operation limestone is fired at 900°–1100° C. Under the present invention the firing temperature is 750°–950° C., preferably 800°–900° C. If the temperature is too high, the resulting calcium oxide crystals fuse together, rendering it impossible to obtain an active slurry. Conversely if the temperature is too low, inadequate decomposition can cause part of calcium carbonate to remain undecomposed.

The calcined product thus obtained is mixed with water, and the mixture is cured in hot water at 90°–100° C. for from over 10 minutes to one hour to yield an active absorbent slurry. A higher temperature above 100° C. may be used instead if the curing is to be concluded in a shorter period of time.

Understandably, the calcined product may be used as a material capable of supplying calcium oxide. It is also possible to add, e.g., coal fly ash and spent absorbent to the calcined product, mix them with water, and cure the mixture in hot water to obtain an absorbent slurry. In this case a curing temperature of 90°–180° C. is favorable as it promotes the elution of calcium sulfate and/or calcium sulfite from the spent slurry and enhance the reactivity.

The absorbent slurry obtained as above is introduced and dispersed into a reactor and, after having absorbed the environmental contaminants in the exhaust gas, e.g., SO$_x$, NO$_x$, and HCl, collected in the form of a dry powder. The process for preparing an absorbent from the spent absorbent will be described below.

A spent absorbent often contains unreacted Ca, and to make most of this Ca content, it is in practice to return a reuse. In a spent absorbent that has absorbed SO$_x$ and the part of the spent absorbent to a fresh absorbent slurry for like, however, the unreacted Ca is covered with such products as calcium sulfite and calcium sulfate and is unable to prove fully effective.

The process of the invention performs curing at elevated temperature and pressure and therefore permits activation of the available Ca content that is left unreacted. Here the curing temperature desirably ranges from 90° to 180° C. If activation within a short time is desired the use of as high a temperature as possible is recommended. When there is much unreacted Ca content in a spent absorbent, the spent slurry after the activation may be directly used as an absorbent. It is further possible to add materials capable of supplying or containing calcium oxide, aluminum oxide, and calcium sulfate and/or calcium sulfite to the spent absorbent slurry, cure the mixture in hot water, and then use the resulting slurry.

If a soluble compound which elevates the boiling point of water is added to and mixed with the absorbent slurry and the mixture is led and dispersed in the reactor, the evaporation of moisture taken up by the absorbent is slow and the $SO_x$ absorption reaction is accelerated. The absorbent that is obtained in conformity with the invention is a porous material with a large specific surface area. It originally is highly active in absorbing $SO_x$ than $Ca(OH)_2$. When the absorbent is brought into contact with $SO_x$ gas in exhaust gas, in the presence of a boiling point-elevating soluble reaction between the alkali absorbent and $SO_x$ to progress compound, the evaporation-retarding effect due to the elevation of boiling point of water allows the neutralization reaction between the alkali absorbent and $SO_x$ to progress through the medium of water. Consequently, the $SO_x$-absorption reaction is promoted. Furthermore, the absorption reactions with acidic gases, such as $SO_3$, NO, $NO_2$, HCl, HF, are facilitated as with $SO_2$.

For the purposes of the invention, the "soluble compound" to be added to the absorbent slurry is a substance which elevates the boiling point of water, such as NaCl, $CaCl_2$, $MgCl_2$, and $Ca(NO_3)_2$. In reality a material containing one or more such substances, preferably seawater, is used.

The above material adsorbs water vapor in a gas and forms a solution of itself. When the water vapor pressure of a saturated aqueous solution of a solid is lower than that of the gas that comes in contact with the solution, the former takes up the moisture content from the gas.

FIG. 3 [from *KAGAKU KOGAKU BENRAN* (Chemical Engineering Handbook), Maruzen Co., 1968, p. 35] graphically represents vapor pressures of saturated aqueous solutions of some salts. The curves of $NaCl$, $MgCl_2$, $CaCl_2$, etc. in the graph indicate that their saturated water vapor pressures are extremely low compared with that of water, suggesting their possibility of causing the phenomenon noted above. With actual exhaust gas, it is advisable to maintain a relative humidity of about 70% rather than a state saturated with water at the exit of the reactor, so as to prevent deposition of reaction products on the walls of the reactor or on the inner surfaces of the lines. Controlling the amount of moisture absorption and hence the moisture content of the absorbent, by reducing the amount of the soluble material to be introduced when the relative humidity is high or vice versa, is a good practice.

Since the soluble material elevates the boiling point of water, it is desirable to detect the gas temperature at the exit of the reactor, compute the saturated vapor pressure of water at that gas temperature, and adjust the quantity of the aqueous solution of the particular material to be introduced lest the relative humidity reach 100%. To be more exact, an absorbent slurry that contains much of the material boosts the boiling point of water and, the quantity to be poured being the same, it arrives at a water dew point in the region where the outlet gas temperature is high, while the point is not reached with a slurry which does not contain such a soluble material. To avoid the deposition of wet scale of the absorbent and reaction products on the walls of the reactor, therefore, care should be used to keep the relative humidity of the outlet gas from increasing to 100%. It is for this reason that, as stated above, the procedure of monitoring the outlet gas temperature, computing the water balance, and controlling the supply of the aqueous solution containing the soluble material is necessary.

The powdery reaction product that is discharged in accordance with the invention may be recycled. In that case, the boiling point-elevating soluble material contained in the reaction product is allowed to be present in the absorbent slurry.

BRIEF DESCRIPTION OF THE DRAWINGS

FIG. 1 is a flow sheet of an apparatus for practicing the process of the invention for treating an exhaust gas;

DETAILED DESCRIPTION OF PREFERRED EMBODIMENTS

EXAMPLE 1

Figure 2:
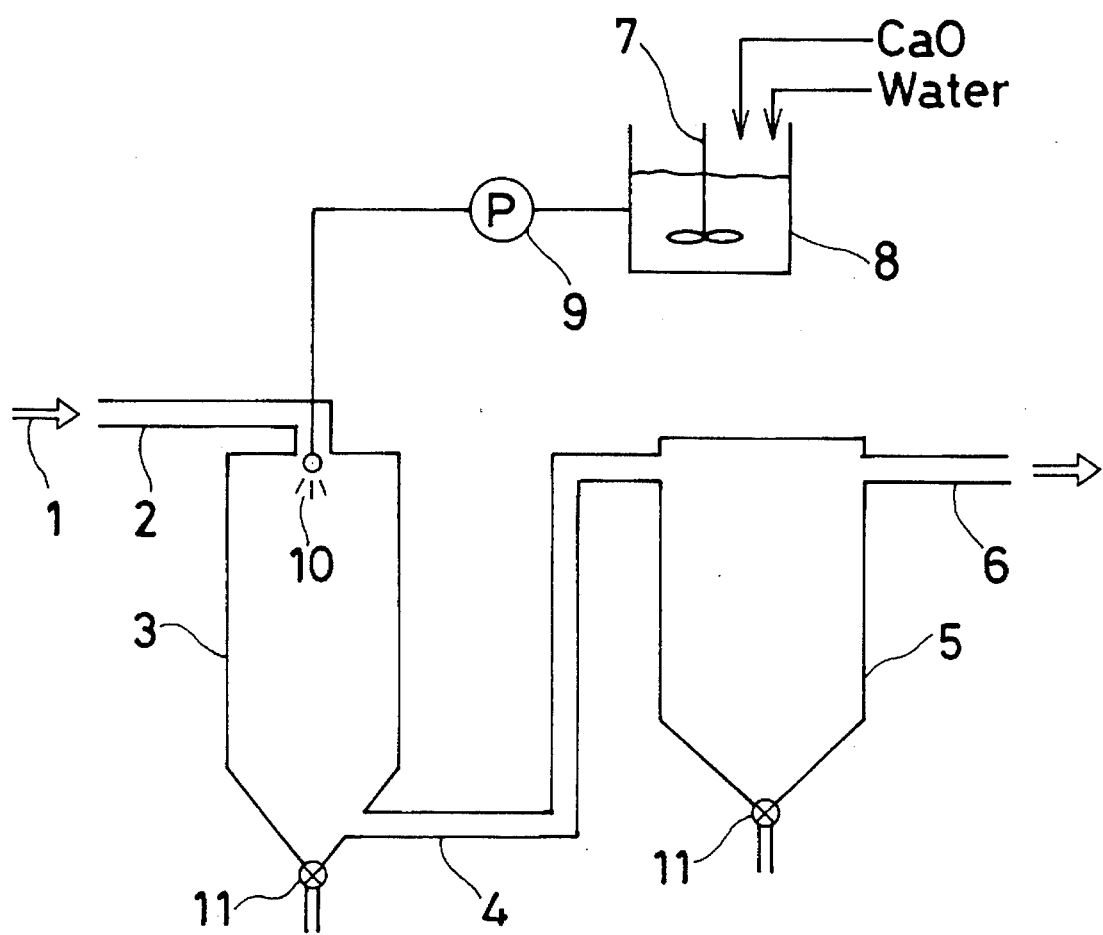
FIG. 2 is a flow sheet of an apparatus for conventionally treating an exhaust gas.
Figure 3:
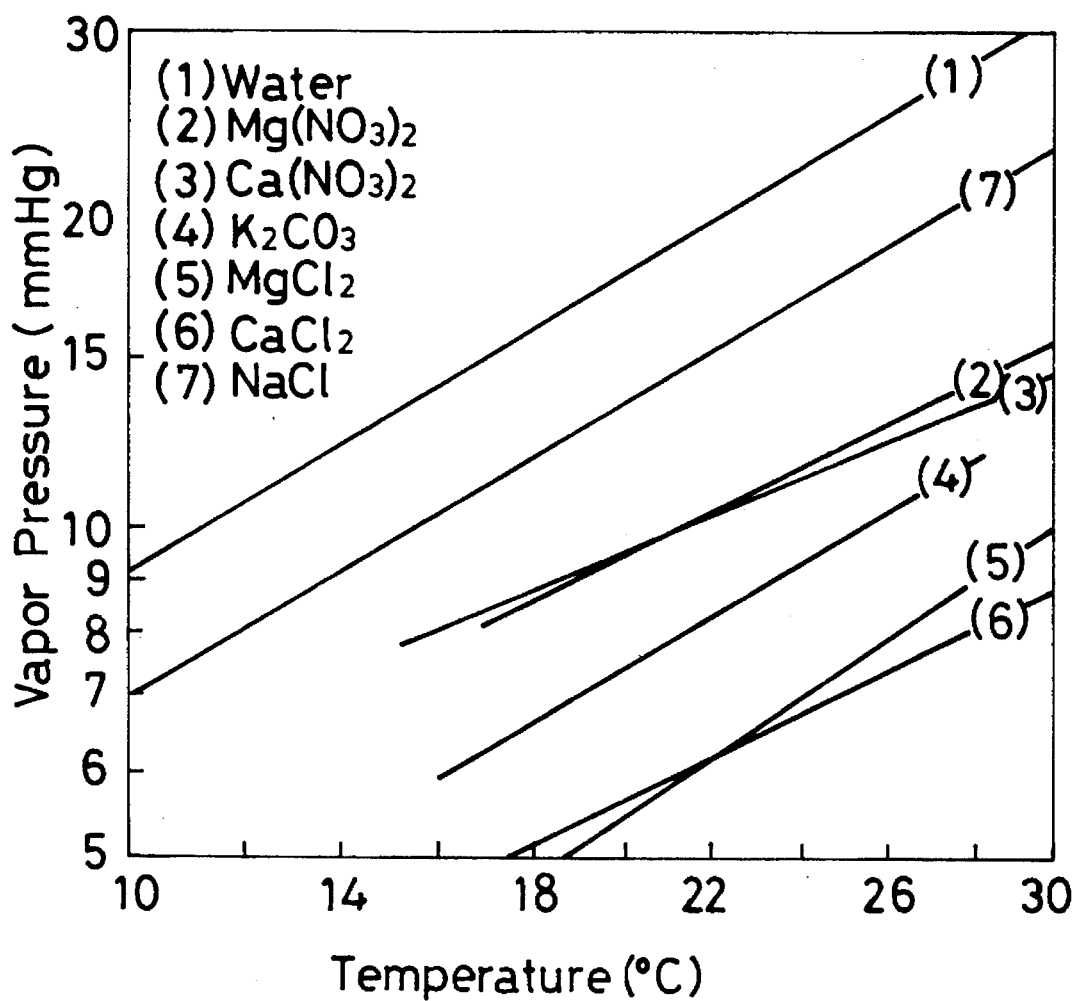
FIG. 3 is a graph showing the vapor pressures of saturated aqueous solutions of some salts.

An example of the present invention will now be described with reference to FIG. 1.

The basic process is the same as that of the prior art, and, while the components used and the flow of process are as described above, the following units are added.

The numeral 13 indicates a tank in which an absorbent slurry of the invention is prepared. The numeral 8 denotes a hydration tank equipped with an agitator 7, in which a hydrated lime slurry is prepared from calcium oxide and water and is transferred by a pump 9 into the tank 13. The tank 13 is meanwhile charged with coal fly ash as a material containing aluminum oxide and silicon dioxide and also with a powdery $SO_x$ absorption reaction, as a material containing calcium reaction product discharged from a product outlet 11 after an sulfate and/or calcium sulfite. The charge is heated by a heating source 16 while being agitated by an agitator 12 and is converted in hot water to an absorbent slurry. This absorbent slurry is supplied, by means of a pump 14, to a line for absorbent slurry transport.

On the other hand, a seawater tank 101 is supplied with seawater 102 which elevates the boiling point of water. The tank is connected by a pump 103 to the line for absorbent slurry transport.

The quantity of the absorbent slurry being supplied to the absorbent slurry transport line is controlled in the following way.

First, the quantity, temperature, moisture content, $SO_x$ concentration, etc. of a given exhaust gas 1 are detected by a detector 106 installed on an exhaust gas inlet line 2. On the basis of the detected values is computed by an arithmetic unit 107 the quantity of the absorbent slurry to be supplied. A valve 111 is manipulated to secure a proper proportion of amount of $SO_x$ at the inlet. In the mean time the exhaust gas the available Ca molar amount in the absorbent to the molar temperature is detected by a temperature detector 105 installed on an outlet line 4, the boiling point-elevating vapor pressure is computed by the arithmetic unit 107 to find a flow rate that maintains a relative humidity below 100%, and this information is conducted to a valve 109, which in turn adjusts the quantity of seawater to be introduced.

Here, in order to introduce water from a water tank 104 through a pump 108 into the absorbent slurry-transport line at a rate corresponding to the quantity of seawater coming from the seawater tank 101 and maintain the quantity of water to be sprayed from the atomizer at a desired level, the arithmetic unit 107 desirably computes the flow rate and transmits the result to a valve 110 which controls the quantity to be introduced. The "increase" or "decrease" in the quantity to be introduced by the valve 110 correspond, respectively, to the "increase" or "decrease" by the valve 109. Thus the quantities of seawater and fresh water to be poured in are controlled to adjust the outlet gas temperature to a desired level, so that the relative humidity of the outlet gas after the elevation of the boiling point can be kept below 100%.

In the process of preparing the absorbent slurry, part of the product that is discharged from the product outlet 11 is recycled. This means that the absorbent slurry naturally is caused to contain a soluble component that elevates the boiling point. Here again the exhaust gas temperature is detected by the temperature detector 105 on the outlet line 104, and the outlet gas temperature is adjusted to a predetermined level by controlling the quantities of seawater and fresh water to be introduced, so as to maintain the relative humidity of the outlet gas after the elevation of the boiling point below 100%.

In the figure, the numeral 3 designates a reactor, 5 a collector, and 6 a discharge line.

EXPERIMENT

Quicklime was thrown in water and slaked, and the hydrated lime slurry thus obtained was mixed with coal fly ash which contained 60 wt % $SiO_2$ and 23 wt % $Al_2O_3$ and a powder of a gypsum/calcium sulfite mixture at a ratio by weight of 20/80, in a proportion by weight on the dry basis of 50:30:20. The quantity of water was equivalent to a weight five times that of the powders combined. This slurry was cured in hot water at 95° C. for 12 hours with stirring to yield an absorbent slurry. The material constituting the resulting slurry had a specific surface area of 85 $m^2$/g, and from X-ray diffraction peaks it was confirmed to be analogous to ettringite.

Using this absorbent slurry, $SO_2$ removal from an exhaust gas was performed in a flow of process illustrated in FIG. 1 under the conditions now to be explained.

The values detected of the gas flowing in the exhaust gas inlet line 2 for treatment were as follows: the gas flow rate, 20 $m^3$N/hour; gas temperature, 140° C.; $SO_2$ concentration, 500 ppm; $SO_3$, 5 ppm; $NO_x$, 125 ppm; HCl, 50 ppm; HF, 20 ppm; $H_2O$, 10 vol %; $CO_2$, 13 vol %; $O_2$, 5 vol %; $N_2$, balance. Of these values, the values of gas flow rate, gas temperature, $SO_2$ concentration, and water content were used in computation to realize a temperature of 60° C. for the outlet lines 4 and 6 and a supply of the absorbent slurry in a molar amount equal to the amount of $SO_2$ introduced into the reactor 3. On the basis of this computation, the absorbent slurry was introduced by the pump 9 and the water by the pump 108. At that time the exhaust gas temperature in the outlet line was 60° C. and the $SO_2$ concentration was 105 ppm.

Next, the valve 109 was opened to admit seawater under such conditions that a relative humidity of less than 100% could be maintained on the basis of the detected exhaust gas temperature of 60° C. inside the outlet line 4. The rate of introduction then was 0.3 liters/hour. The valve 110 was throttled to reduce the fresh water supply to the same level as that of seawater. The value of 60° C. detected by the temperature detector and the maintenance of the relative humidity below 100% were supported by the facts that no condensed water was found in the reactor outlet gas and there The $SO_x$ concentration in the exhaust gas inside the occurred no scale trouble due to any deposition of product. outlet line 6 then was 55 ppm, clearly demonstrating an improved desulfurization performance. The concentrations of acid gases $SO_3$, $NO_x$, HCl, and HF were measured too, the values being: $SO_3$, less than 1 ppm; $NO_x$, 80 ppm, HCl, 3 ppm; and HF, 2 ppm.

The evaporation of droplets of the absorbent slurry sprayed by the atomizer 10 was slowed down by the elevation of the boiling point caused by the NaCl content in the seawater. The retardation of evaporation combined with an increase in the water content in the absorbent to a surprising reduction of the outlet $SO_x$ concentration from 110 ppm down to 55 ppm. Moreover, the experiment proved that the concentrations of the acidic gases, $SO_3$, HCl, $NO_x$, and HF, could be reduced as well. The product contained about 5 wt % of Cl but could be handled as a powder.

EXPERIMENT 2

The desulfurization product obtained in Experiment 1 and that contained about 5 wt % Cl was mixed with hydrated lime and coal ash at a weight ratio of 10:70:20. With the addition of water, the mixture was cured in hot water at 95° C. for hours. In the same manner as with the $SO_x$ absorption test conducted above, the absorbent slurry and fresh water were supplied while the valve 109 was totally closed, so that the exhaust gas temperature inside the outlet line could be kept at 60° C. The $SO_x$ concentration in the outlet line 6 was 85 ppm.

Following this, the valve 109 was opened to introduce seawater under conditions such that a relative humidity below 100% could be maintained on the basis of the readings of the exhaust gas temperature detector 105 on the outlet line 4. The rate of seawater supply at that time was 0.2 liters/hour, the valve 110 was throttled to reduce the water supply to the same level as that of seawater. The $SO_x$ concentration in the exhaust gas inside the outlet line 6 then was 50 ppm, and no condensed water was found in the reactor outlet gas. At the same time, the $SO_3$, $NO_x$, HCl, and HF concentrations in the exhaust gas were measured. The values were: $SO_3$, less than 1 ppm; $NO_x$, 70 ppm; HCl, 2 ppm; and HF, 2 ppm.

EXPERIMENT 3

The procedure described in Experiment 1 was followed except that the absorbent slurry obtained in Experiment 1 was used and a saturated aqueous solution of $CaCl_2$, $MgCl_2$, or $Ca(NO_3)_2$ was poured into the seawater tank 101. The $SO_x$ concentration in the exhaust gas inside the outlet line 6 was lower than the value in the state when the pouring of any such saturated aqueous solution was suspended. With each substance, the relative humidity was kept below 100% by water balance computation from the detected temperature value of the reactor outlet gas, and it was proved that the effect of improving the desulfurization performance can be maintained stably without the deposition of wet scale of the absorbent or reaction product.

Comparative Example 1

An $SO_x$ absorption test was conducted in the same manner as described in Experiment 1 with the exception that the absorbent slurry used in Experiment 1 was replaced by a slurry of hydrated lime. When the valve 109 was fully closed the exhaust gas temperature was 60° C. The $SO_x$ concentration in the exhaust gas inside the outlet line 6 at that time was 280 ppm.

Next, the valve 109 was opened to introduce seawater under the conditions such that the relative humidity was maintained below 100% on the basis of the detected exhaust gas temperature of 60° C. in the outlet line 4. The rate of seawater supply then was 0.3 liters/hour. The valve 110 was throttled to reduce the supply of fresh water to the level equal to the seawater supply. The value detected by the temperature detector 105 was 60° C. and the $SO_x$ concentration in the exhaust gas within the outlet line 6 was 170 ppm.

As can be seen from this comparative example, the beneficial effect of adding a soluble compound that elevates the boiling point of water is observed even when the absorbent is hydrated lime. However, the desulfurization effect achieved is not as high as when the absorbent slurry of the present invention is used.

EXAMPLE 2

Coal fly ash containing 60 wt % $SiO_2$ and 23 wt % $Al_2O_3$, hydrated lime, gypsum dihydrate, and calcium sulfite at a ratio by weight as powder of 30:50:10:10 were placed in an autoclave, mixed with water in an amount five times that of the powder mixture (water/powder weight). The mixture was cured with stirring in hot water at varying temperatures of 70°–200° C. for varied periods ranging from 5 minutes to 12 hours. Absorbent slurries Nos. 1–17 as listed in Table 1 were obtained.

With these slurries, $SO_x$ absorption tests were conducted using the same apparatus and the same procedure as described in Experiment 1 with the exception that seawater was not introduced into the system. The results are given in Table 1.

TABLE 1

| Absorbent slurry No. | Curing temp., °C. | Curing time hours | $SO_x$ removal, % |
| --- | --- | --- | --- |
| 1 | 70 | 12 | 58 |
| 2 | 80 | 12 | 76 |
| 3 | 90 | 12 | 82 |
| 4 | 95 | 6 | 78 |
| 5 | 95 | 12 | 83 |
| 6 | 100 | 6 | 80 |
| 7 | 100 | 12 | 84 |
| 8 | 120 | 3 | 78 |
| 9 | 120 | 6 | 80 |
| 10 | 120 | 12 | 64 |
| 11 | 150 | 0.5 | 81 |
| 12 | 150 | 1 | 73 |
| 13 | 150 | 3 | 72 |
| 14 | 180 | 5 min | 80 |
| 15 | 180 | 10 min | 75 |
| 16 | 180 | 30 min | 68 |
| 17 | 200 | 5 min | 65 |

Table 1 indicates that curing takes many hours at low temperatures but concludes in minutes at high temperatures.

EXAMPLE 3

After the $SO_x$ absorption test of the absorbent slurry No. 7 in Example 2, the spent absorbent (comprising: $SiO_2$, 5.5 wt %; $Al_2O_3$, 1.8 wt %; $Ca(OH)_2$, 10.3 wt %; $CaSO_4.2H_2O$, 11.6 wt %; $CaSO_3.½H_2O$, 54.9 wt %; $CaCO_3$, 12.6 wt %; misc., bal.) was mixed with hydrated lime and coal fly ash at a powder weight ratio of 20:50:30. Excepting this, the procedure of the preceding example was repeated to prepare absorbent slurries Nos. 18–27 and the slurries were tested for $SO_x$ absorption. The results are shown in Table 2.

TABLE 2

| Absorbent slurry No. | Curing temp., °C. | Curing time, hours | $SO_x$ removal rate, % |
| --- | --- | --- | --- |
| 18 | 80 | 12 | 72 |
| 19 | 90 | 12 | 78 |
| 20 | 100 | 12 | 80 |
| 21 | 120 | 3 | 80 |
| 22 | 150 | 0.5 | 83 |
| 23 | 150 | 1 | 75 |
| 24 | 150 | 3 | 73 |
| 25 | 180 | 5 min | 83 |
| 26 | 180 | 10 min | 80 |
| 27 | 180 | 30 min | 75 |

Table 2 makes it clear that when a spent absorber is used, curing at a high temperature improves its performance.

EXAMPLE 4

Quicklime was chosen as a material capable of supplying calcium oxide, and the coal fly ash used in Example 2 as a material containing both silicon dioxide and aluminum oxide. These materials, gypsum dihydrate, and calcium sulfite were varied in percentage by weight and mixed with five times as much water (water/powder weight), and absorbent slurries Nos. 28–43 were prepared in the following way.

For the preparation, quicklime was first introduced into a vessel equipped with an agitator and filled with warm water (at 70° C.) and hydrated to slaked lime. Each mixture of coal fly ash, gypsum dihydrate, and calcium sulfite was placed into the slurry and cured in hot water at 95° C. for 12 hours with stirring.

Using these slurries, $SO_x$ absorption experiments were conducted with the same apparatus and method as used in Example 1, and the results given in Table 3 were obtained.

TABLE 3

| Absorbent slurry No. | Quicklime (as hydrated lime) | Coal ash | CaSO$_4$.½H$_2$O | CaSO$_3$.½H$_2$O | SO$_x$ removal, % |
| --- | --- | --- | --- | --- | --- |
| 28 | 20 | 60 | 10 | 10 | 82 |
| 29 | 30 | 50 | 10 | 10 | 81 |
| 30 | 40 | 40 | 10 | 10 | 81 |
| 31 | 50 | 30 | 10 | 10 | 82 |
| 32 | 60 | 20 | 10 | 10 | 78 |
| 33 | 80 | 10 | 5 | 5 | 75 |
| 34 | 50 | 30 | 20 | 0 | 80 |
| 35 | 50 | 30 | 15 | 5 | 82 |
| 36 | 50 | 30 | 5 | 15 | 81 |
| 37 | 50 | 30 | 0 | 20 | 80 |
| 38 | 50 | 50 | 0 | 0 | 68 |
| 39 | 50 | 49 | 0.5 | 0.5 | 78 |
| 40 | 50 | 40 | 5 | 5 | 79 |
| 41 | 50 | 45 | 2.5 | 2.5 | 78 |
| 42 | 50 | 25 | 12.5 | 12.5 | 75 |
| 43 | 50 | 10 | 20 | 20 | 60 |

EXAMPLE 5

Into 2600 g of warm water (about 70° C.) was placed 360 g of quicklime, and immediately after the conclusion of hydration of the quicklime, 15 g coal fly ash, 5 g gypsum dihydrate, and 5 g calcium sulfite were added, and 20 minutes of stirring yielded an absorbent slurry. The curing temperature was 98° C.

With this absorbent, an experiment on SO$_x$ absorption was performed using the same apparatus and method as described in Experiment 1 except that the SO$_x$ and NO concentration in the untreated gas were changed to 2250 ppm and 700 ppm, respectively, and seawater was not introduced. The result is given in Table 4.

EXAMPLE 6

Quicklime (360 g) was thrown in 2600 g of warm water (about 70° C.). Immediately after the conclusion of hydration of the quicklime, 25 g of a spent absorbent (composition: SiO$_2$, 26 wt %; Al$_2$O$_3$, 9.3 wt %; Ca(OH)$_2$, 5.2 wt %; CaSO$_4$.2H$_2$O, 7.3 wt %; CaSO$_3$.½H$_2$O, 43.6 wt %; CaSO$_3$, 5.4 wt %; misc., bal.). Twenty minutes of stirring gave an absorbent slurry. The result of experiment done similarly to Example 5 is shown in Table 4.

Comparative Example 2

Quicklime (360 g) was thrown in 2600 g of warm water (about 70° C.). Fifteen minutes after the conclusion of hydration of the quicklime, coal fly ash, gypsum dihydrate, and calcium sulfite were added in the same amounts as used in Example 5. The mixture was stirred for 20 minutes, when an absorbent slurry was obtained. This slurry was subjected to the same experiment as conducted in Example 5. Table 4 shows the result.

Comparative Example 3

To 2600 g of warm water (about 70° C.) were added 10 g coal fly ash, 10 g gypsum dihydrate, and 5 g calcium sulfite, and the mixture was stirred. With the further addition of 360 g quicklime, the mixture was stirred for 20 minutes to form an absorbent slurry. An experiment with this absorbent slurry, similar to that in Example 5, gave a result shown in Table 4.

Comparative Example 4

Quicklime (360 g) was thrown in 2600 g of warm water (about 70° C.) and the mixture was stirred for 20 minutes to afford an absorbent slurry. The result of an experiment with this slurry, similar to that in Example 5, is shown in Table 4.

EXAMPLE 7

An autoclave, equipped with units capable of supplying powders through the manipulation of rotary valves from above a vessel hermetically sealed under pressure, was charged with 2600 g of water. The charge was heated to about 90° C., and 360 g of quicklime powder was introduced. The temperature rose to 130° C., and immediately 25 g of the spent absorbent used in Example 6 was admitted through a valve into the vessel. The mixture was cured by stirring for 20 minutes to obtain an absorbent slurry. This slurry was experimented similarly to Example 5 to obtain a result shown in Table 4.

TABLE 4

| | SOx removal, % |
| --- | --- |
| Example 5 | 75 |
| Example 6 | 75 |
| Example 7 | 73 |
| Comp. Ex. 2 | 43 |
| Comp. Ex. 3 | 41 |
| Comp. Ex. 4 | 41 |

The table reveals that an absorbent with a high desulfurization activity can be obtained by a judicious choice of timing for mixing and reaction for the material capable of supplying calcium oxide and the material or materials containing silicon dioxide, aluminum oxide, calcium sulfate, and calcium sulfite.

EXAMPLE 8

Quicklime (360 g) was thrown in 2600 g of warm water (about 70° C.) for the slaking of the quicklime. Immediately after the conclusion of the reaction, the spent absorbent used in Example 6 was added in varied amounts of 50 g, 75 g, and 100 g, and otherwise the same procedure as used in Example 5 was followed to prepare absorbent slurries A, B, and C.

The slurries were used in the same experiment as conducted in Example 5. The results are given in Table 5.

TABLE 5

| Absorbent slurry | $SO_x$ removal, % |
| --- | --- |
| A | 75 |
| B | 75 |
| C | 75 |

EXAMPLE 9

Into 2600 g of warm water (about 70° C.) were simultaneously added 30 g coal ash, 20 g calcium sulfite, and 360 g quicklime. Hydration of the mixture with stirring for 20 minutes gave a slurry.

This slurry was experimented similarly to Example 5, and showed an $SO_x$ removal of 75%.

EXAMPLE 10

The autoclave employed in Example 7 was charged with 2600 g of water and 50 g of the spent absorbent used in Example 6. The mixture was stirred at 120° C. for 30 minutes. Next, 360 g of quicklime powder was admitted from a conduit above the autoclave through a valve into the vessel. Five minutes of stirring gave an absorbent slurry. The slurry temperature increased to about 180° C.

An experiment similar to that in Example 5 showed that this slurry achieved an $SO_x$ removal of 71%.

EXAMPLE 11

Absorbent slurries were prepared by repeating the procedure of Example 9 with the exception that the calcium sulfite added was in the form of a mixture with gypsum dihydrate, in varied proportions as shown in Table 6.

Experiments conducted with these slurries in the same manner as described in Example 5 gave results as shown in Table 6.

TABLE 6

| Absorbent slurry No. | gypsum dihydrate/calcium sulfite (wt. ratio) | $SO_x$ removal, % | Remarks |
| --- | --- | --- | --- |
| 44 | 50/50 | 56 | Comp.Ex. |
| 45 | 40/60 | 55 | " |
| 46 | 30/70 | 62 | " |
| 47 | 20/80 | 74 | Invention |
| 48 | 10/90 | 76 | " |

EXAMPLE 12

Calcium carbonate (reagent; purity 99.8 wt %) and coal fly ash (composition: $SiO_2$, 49.4 wt %; $Al_2O_3$, 26.8 wt %; $Fe_2O_3$, 7.6 wt %; CaO, 2.1 wt %; $SO_3$, 0.8 wt %; unburnt C, 9.2 wt %; misc., bal.) were mixed at a weight ratio of 80:20, and the mixture was calcined at 850° C. for 2 hours. The calcined product was added in warm water (70° C.) in an amount about five times the weight of the product. With stirring for about 20 minutes, the mixture was cured in hot water kept at 95° C. The slurry so obtained was experimented similarly to Example 5. The $SO_x$ removal attained was 71%.

EXAMPLE 13

Calcium carbonate (reagent; purity 99.8 wt %) and coal (ash content, 8.5 wt %; S content, 2.1 wt %) were ground and mixed at a weight ratio of 50:50. The mixture was calcined in an electric furnace at 850° C. for 2 hours to obtain a calcined product. The product was analyzed to have a composition: CaO, 80.6 wt %; $CaCO_3$, 5.5 wt %; $SiO_2$, 7.5 wt %; $Al_2O_3$, 3.0 wt %; $CaSO_4$, 1.2 wt %; misc., bal. This calcined product was added in warm water (70° C.) in an amount five times the weight of the powder. With stirring the mixture was kept at 98° C. for about 20 minutes. The slurry thus obtained, when experimented in the same way as in Example 5, gave an $SO_x$ removal of 71%.

EXAMPLE 14

Limestone from the Ikura area (contg. 95 wt % $CaCO_3$) and coal (ash content, 4.3 wt %; S content, 1.6 wt %) were mixed and ground at a weight ratio of 70:30. The mixture was calcined at varied temperatures of 700°, 800°, 900°, 1000°, and 1100° C. for 2 hours each to obtain calcined products A, B, C, and D, respectively. The calcined products were added in warm water in the manner described in Example 12 and cured with stirring at 95° C. for about one hour. The resulting slurries were used in experiments similar to that of Example 5 and achieved $SO_x$ removal ratios: A, 70%; B, 73%; C, 72%; D, 68%; and E, 61%. The slurry A that used the product calcined at 700° C. retained much undecomposed $CaCO_3$, indicating a low ratio of utilization of coal. The absorbent slurries that used the products calcined at 1000° C. and 1100° C. showed low $SO_x$ removal ratios.

EXAMPLE 15

The limestone used in Example 14 was mixed and ground with coal having an ash content of 21.6% at a ratio of 80:20 (by weight). The mixture was placed in an electric furnace at 800° C. where the atmosphere had been adjusted to contain 5 vol % oxygen, and was calcined for one hour. The calcined product was thrown in warm water (70° C.) in an amount five times the weight of the powder. Curing with stirring at 98° C. for about 20 minutes yielded a slurry. This slurry was used in an experiment similar to that of Example 5, when the $SO_x$ removal ratio attained was 71%.

EXAMPLE 16

To a spent absorbent of a composition, in percent by weight: $Ca(OH)_2$, 35.2; $CaCO_3$, 12.6; $CaSO_4.2H_2O$, 5.5; $CaSO_3.+e,fra 1/2+ee H_2O$, 33.2; $SiO_2$, 6.1; $Al_2O_3$, 2.3; misc., bal., was added water in an amount four times the weight of the absorbent. The mixture was cured in hot water for one hour at varied curing temperatures ranging from 70° to 200° C. to prepare absorbent slurries. These slurries were experimented similarly to Example 5 and gave results shown in Table 7.

TABLE 7

| Absorbent slurry No. | Curing temp., °C. | $SO_x$ removal, % |
| --- | --- | --- |
| 49 | 70 | 53 |
| 50 | 80 | 65 |
| 51 | 90 | 69 |
| 52 | 100 | 70 |
| 53 | 120 | 70 |
| 54 | 150 | 72 |

TABLE 7-continued

| Absorbent slurry No. | Curing temp., °C. | SO$_x$ removal, % |
|---|---|---|
| 55 | 180 | 68 |
| 56 | 200 | 65 |

EXAMPLE 17

An absorbent slurry prepared in the same way as with the slurry No. 5 in Example 5 was mixed with the spent absorbent powder used in Example 16 so that the overall solids concentration was 35 wt %. Slurries were obtained by curing the mixture differently, at 70° C. for 18 hours, at 100° C. for 12 hours, and at 180° C. for 5 minutes. These slurries, upon experiments performed in the same way as in Example 5, gave SO$_x$ removal ratios of 83%, 86%, and 90%, respectively. The slurry cured at 70° C. for 18 hours showed an extreme increase in viscosity and partial solidification.

EXAMPLE 18

The spent absorbent used in Example 16 was mixed with hydrated lime and coal fly ash at a weight ratio of 40:40:20. With the addition of five-fold water on the weight basis, the mixture was placed in an autoclave following the procedure of Example 16, with the exception that the temperature of curing in hot water was varied as listed in Table 8. The slurries thus obtained were used in experiments similar to that of Example 5 and showed the SO$_x$ removal ratios shown in Table 8.

TABLE 8

| Absorbent slurry No. | Curing temp., °C. | Curing time, hours | SO$_x$ removal, % |
|---|---|---|---|
| 57 | 80 | 6 | 70 |
| 58 | 80 | 12 | 75 |
| 59 | 100 | 6 | 74 |
| 60 | 100 | 12 | 76 |
| 61 | 120 | 3 | 75 |
| 62 | 120 | 6 | 76 |
| 63 | 150 | 3 | 80 |
| 64 | 150 | 1 | 77 |
| 65 | 150 | 30 min | 72 |
| 66 | 180 | 5 min | 78 |
| 67 | 180 | 10 min | 71 |
| 68 | 180 | 30 min | 70 |

EXAMPLE 19

Experiments were made on SO$_x$ removal, using the absorbent slurries obtained in Examples 5, 6, 13, and 18 (absorbent slurry No. 64). The SO$_2$ and NO concentrations in the gas being treated were changed to 2250 and 700 ppm, respectively, but otherwise the same apparatus and method were used as in Example 1. The SO$_x$ removal ratios achieved by those absorbent slurries were 75, 75, 72, and 77%, respectively, when fresh water was introduced into them, but the ratios were improved to 83, 82, 80, and 88% when seawater was introduced.

The concentrations of acidic gases SO$_3$, NO$_x$, HCl, and HF were measured to be: SO$_3$, 0.8–1.2 ppm; NO$_x$, 550–590 ppm; HCl, 1.5–3 ppm; and HF, 1.4–2 ppm.

The adoption of the present invention makes possible efficient removal of environmental contaminants from exhaust gases by the semidry method. The provision of an absorbent slurry containing much active Ca compounds permits reduction of the amount of slurry to be sprayed.

Also, according to the present invention, a novel absorbent slurry with the addition of a soluble compound that elevates the boiling point of water is sprayed in a reactor for contact with SO$_x$ in an exhaust gas. In this way the water-retaining property of the absorber is enhanced, and the evaporation-retarding effect that results from the elevation of the boiling point of water accelerates the reaction of the absorbent with SOx through the medium of water. Consequently, (1) the SO$_x$ removal efficiency is improved, with concurrent removal of acidic gases, i.e., NO$_x$, HCl, and HF, and (2) the reactivity of the absorbent increases, reducing the replenishment cost of the expensive absorbent.

Further, the reactor outlet gas temperature is detected and the addition of a hygroscopic material is controlled so as to maintain a relative humidity of less than 100%, taking the elevation of the boiling point by that material into consideration. This prevents the deposition of wet scales of the absorbent and reaction products.

We claim:

1. A process for removing environmental contaminants from an exhaust gas, the environmental contaminants being selected from a group consisting of SO$_x$, NO$_x$, HCl and HF, by an absorbent slurry containing alkaline compounds in a reactor, comprising the steps of:

a) adding calcium sulfate, calcium sulfite, aluminum oxide, and silicon dioxide during or immediately after hydration of calcium oxide;

b) curing the resulting mixture in water at a temperature between 90° and 100° C. for only 5 to 30 minutes to produce a pumpable absorbent slurry; and c) immediately introducing and dispersing the absorbent slurry in the reactor for contact with SO$_x$, NO$_x$, HCl, and HF for absorption thereof, wherein the water content of the absorbent slurry is adjusted so that water in the absorbent slurry evaporates in the reactor and a dry powder of the spent absorbent slurry results; said absorbent slurry having a composition on a dry basis of 65–72 wt % CaO, 0.5–20 wt % Al$_2$O$_3$, 1.5–34 wt % SiO$_2$, and 0.5–25 wt % total of CaSO$_4$ and CaSO$_3$.

2. The process described in claim 1, further comprising curing the dry powder in water with calcium oxide, calcium sulfate, calcium sulfite, aluminum oxide, and silicon dioxide for slaking calcium oxide at a temperature between 90° and 100° C. for 5 to 30 minutes, and introducing and dispersing the resulting slurry in the reactor for contact with an environmental contaminant selected from a group consisting of SO$_x$, NO$_x$, HCl and HF for absorption thereof.

3. The process described in claim 1, wherein at least one substance selected from a group consisting of seawater, NaCl, CaCl$_2$, MgCl$_2$, Ca(NO$_3$)$_2$, and dry powder of the spent absorbent is added to the absorbent slurry.

4. The process describe in claim 3, wherein at least one substance selected from a group consisting of seawater and dry powder is added to the absorbent slurry.

5. The process described in claim 3 wherein the dry powder of spent absorbent comprises calcium sulfate and calcium sulfite.

6. The process according to claim 1 wherein the resulting absorbent slurry contains a gelled material having a surface area of up to 50–100 m$^2$/g.

7. The process according to claim 1 wherein the quantity of water is equivalent to a 2.5–10 times that of the dry powders combined.

8. A process for removing environmental contaminants from an exhaust gas, the environmental contaminants being selected from a group consisting of $SO_x$, $NO_x$, HCl and HF, by an absorbent slurry containing alkaline compounds in a reactor, comprising the steps of:

a) mixing calcium sulfite, calcium sulfate, aluminum oxide, and silicon dioxide with calcium oxide;

b) calcining the resulting mixture at 750°–950° C.; mixing the resulting calcined mixture with water;

c) curing the resulting aqueous mixture at a temperature between 90° and 100° C. for only 5 to 30 minutes to produce a pumpable slurry of hydrated absorbent; and d) immediately introducing and dispersing the absorbent slurry in the reactor for contact with $SO_x$, $NO_x$, HCl, and HF for absorption thereof, wherein the water content of the absorbent slurry is adjusted so that water in the absorbent slurry evaporates and a dry powder of the spent absorbent slurry results in the reactor; said absorbent slurry having a composition on a dry basis of 65–72 wt % CaO, 0.5–20 wt % $Al_2O_3$, 1.5–34 wt % $SiO_2$, and 0.5–25 wt % total of $CaSO_4$ and $CaSO_3$.

9. The process described in claim 8, wherein at least one substance selected from a group consisting of seawater, NaCl, $CaCl_2$, $MgCl_2$, $Ca(NOB)_2$, and dry powder of the spent absorbent is added to the absorbent slurry.

10. The process described in claim 9, wherein at least one substance selected from a group consisting of seawater and the dry powder is added to the absorbent slurry.

11. The process described in claim 9 wherein the dry powder of spent absorbent comprises calcium sulfate and calcium sulfite.

12. The process described in claim 8, further comprising curing the dry powder in water with calcium oxide, calcium sulfate, calcium sulfite, aluminum oxide, and silicon dioxide for slaking calcium oxide at temperature between 90° and 100° C. for 5 to 30 minutes, and introducing and dispersing a resulting slurry in the reactor for contact with $SO_x$, $NO_x$, HCl, and HF for absorption thereof.

13. The process according to claim 8 wherein the resulting absorbent slurry contains a gelled material having a surface area of up to 50–100 $m^2/g$.

\* \* \* \* \*